(12) United States Patent
Burke

(10) Patent No.: US 7,661,636 B1
(45) Date of Patent: Feb. 16, 2010

(54) COMBINED BOTTLE HOLDER AND ACTIVITY CENTER APPARATUS FOR INFANT

(76) Inventor: Julie Burke, 564 Poplar Dr., Riva, MD (US) 21140

( * ) Notice: Subject to any disclaimer, the term of this patent is extended or adjusted under 35 U.S.C. 154(b) by 0 days.

(21) Appl. No.: 12/239,257

(22) Filed: Sep. 26, 2008

Related U.S. Application Data

(60) Provisional application No. 60/960,339, filed on Sep. 26, 2007.

(51) Int. Cl.
*A47D 15/00* (2006.01)
(52) U.S. Cl. .................. 248/102; 446/227
(58) Field of Classification Search .............. 248/102, 248/103, 104; 446/227
See application file for complete search history.

(56) References Cited

U.S. PATENT DOCUMENTS

| | | | |
|---|---|---|---|
| 4,320,883 A | | 3/1982 | Bass |
| D266,273 S | | 9/1982 | Bass |
| 4,722,713 A | | 2/1988 | Williams et al. |
| 5,397,039 A | | 3/1995 | Parcelles |
| D375,796 S | | 11/1996 | Beaver |
| 5,702,039 A | * | 12/1997 | Olaiz ................... 224/409 |
| 5,704,505 A | * | 1/1998 | Singh ................... 215/397 |
| 5,967,345 A | * | 10/1999 | Subotin ............. 211/119.007 |
| 6,003,821 A | | 12/1999 | Fabian et al. |
| 6,082,681 A | | 7/2000 | Rand |
| 6,213,547 B1 | * | 4/2001 | Bowe et al. ............ 297/188.01 |
| 6,598,838 B2 | * | 7/2003 | Suh ......................... 248/104 |
| 6,827,317 B1 | | 12/2004 | Risaliti |
| 6,938,861 B1 | | 9/2005 | Ballard et al. |
| 6,961,961 B1 | | 11/2005 | Ezra |
| 6,966,472 B2 | * | 11/2005 | Szarek ..................... 224/607 |
| D573,662 S | | 7/2008 | Behn et al. |
| 7,472,871 B1 | * | 1/2009 | Demontegnac ............ 248/104 |
| 2002/0162918 A1 | * | 11/2002 | Suh ......................... 248/104 |
| 2007/0175408 A1 | | 8/2007 | Spencer |
| 2007/0252048 A1 | * | 11/2007 | Ivie et al. .................. 248/104 |
| 2008/0093513 A1 | | 4/2008 | Kunzelman |

* cited by examiner

*Primary Examiner*—Ramon O Ramirez
(74) *Attorney, Agent, or Firm*—Rosenberg, Klein & Lee

(57) ABSTRACT

An combined bottle holder and activity center apparatus for an infant is provided. The apparatus generally comprises at least one mounting strap portion having upper and lower ends; a holding ring portion disposed at a lower end of the mounting strap portion; a support strap portion coupled to at least one of the mounting strap and holding ring portions; and, a plurality of interactive elements coupled in manipulable manner to at least one of the mounting strap and holding ring portions. The holding ring portion defines a looped receiving space for a base portion of a feed bottle. The support strap portion includes an engaging member for retentively engaging a forward portion of the feed bottle. Each of the interactive elements is thematically configured with visual and tactile distinction one from the other.

19 Claims, 7 Drawing Sheets

COMBINED BOTTLE HOLDER AND ACTIVITY CENTER APPARATUS FOR INFANT

RELATED APPLICATION DATA

This Application is based on U.S. Provisional Patent Application No. 60/960,339, filed 26 Sep. 2007.

BACKGROUND OF THE INVENTION

1. Field of the Invention

The subject combined bottle holder and activity center apparatus for an infant is generally directed to an apparatus for use with an infant car seat or other support structure about an area where an infant may be seated or reclined. More specifically, the subject apparatus is one which may be attached to the support apparatus to safely suspend a feed bottle for a seated or reclined infant's self-feeding therefrom, and do so while presenting a variety of elements for stimulating and interactively engaging the infant. The Apparatus in this manner provides a readily adaptable tool for simultaneously comforting and captivating the infant, and at the same time easing the care giving burden on the infant's parent or other attendant.

The challenges of caring for an infant are well appreciated by adults universally. Even for the most organized and tenderly efficient mothers, the constant all-absorbing nature of the care giving responsibility is at times overwhelming especially when needs of the infant requiring certain immediate response arise frequently at sporadic intervals. The most prominent of such needs may be the frequent feedings required for infants which, for the sake of the infants' health, cannot be deferred or even delayed by any significant amount of time. Unfortunately, the hunger pangs of infants occur quite abruptly, often while the caregiver is tending to another important task. The caregiver must then set the task aside altogether in order to administer the feeding. Some of the most inopportune times for such occurrences may be, for example, while the caregiver is in the process driving, shopping (with the infant seated in a carriage or in a portable car seat carried in the cart), or carrying out household chores.

Typically, when the infant cries out, the caregiver will very shortly, if not immediately, thereafter pull the vehicle over, withdraw to a private location, or otherwise drop the other task at hand in order to tend to the infant. The caregiver will then hold the feed bottle to the infant's mouth for the duration of feeding—which especially for younger infants—amounts to a considerable period of time.

While parental aids are available to help in supporting the bottle during the feeding process, no apparatus heretofore known provides such help in a sufficiently safe, effective, and simple manner to reliably assure the responsible caregiver enough to relinquish any meaningful measure of control over the feeding process thereto. The more effective of the contraptions heretofore known tend to be bulky and complicated to the point of being too cumbersome for use regularly. Even when they are properly used, the resulting assemblies prove overly restrictive and do little to draw and occupy the infant's attention. More often than not, the resulting assemblies also obstruct the caregiver's clear and open view of the infant's face during feeding, hindering the caregiver's ability to monitor the feeding and visually interact with the infant.

Other devices heretofore known fail for various reasons to even provide stable support of the feed bottle. Nor do the known devices provide adequate support while preserving a safe and forgiving structure immediately about the infant's face and body. Consequently, there is a need for an apparatus of simple structure which provides safe and reliable support for a feed bottle, whereby an infant seated or reclined thereabeneath may effectively self-feed while being stimulated and mentally engaged during the process.

2. Prior Art

Devices for holding baby bottles are known in the art, as are novelty toy items and baby activity centers.

The best prior art known to Applicant includes: U.S. Pat. Nos. 6,938,861; 6,961,961; 4,722,713; 6,213,547; 6,827,317; 6,082,681; 6,003,821; 5,397,039; 4,320,883; D573,662; D266,273; D375,796; 5,704,505; 5,613,657; 5,664,746; 5,135,189; D325,636; 4,630,793; 4,320,883; 6,971,612; 6,601,803; D462,775; 6,598,837; D454,957; 6,598,838; 6,705,576; D451,201; 6,386,490; D438,626; D413,984; D447,872; 6,056,246; D452,196; D443,933; 7,284,790; 7,012,541; 6,824,112; 5,312,282; 5,217,192; 3,512,301; 5,072,843. Such known devices, however, fail to provide the combination of features and advantages provided by the subject apparatus.

SUMMARY OF THE INVENTION

It is an object of the present invention to provide an apparatus which holds and safely suspends an infant feed bottle from a surrounding support structure while presenting various stimulating and mentally engaging elements for the infant.

It is another object of the present invention to provide a combined bottle holder and activity center apparatus for an infant which is simple in structure.

It is still another object of the present invention to provide a combined bottle holder and activity center apparatus for an infant which is both safe and reliable in use.

These and other objects are attained in an apparatus formed in accordance with the present invention. The apparatus generally comprises at least one mounting strap portion having upper and lower ends; a holding ring portion disposed at a lower end of the mounting strap portion; a support strap portion coupled to at least one of the mounting strap and holding ring portions; and, a plurality of interactive elements coupled in manipulable manner to at least one of the mounting strap and holding ring portions. The holding ring portion defines a looped receiving space for a base portion of a feed bottle. The support strap portion includes an engaging member for retentively engaging a forward portion of the feed bottle. Each of the interactive elements is thematically configured with visual and tactile distinction one from the other.

DETAILED DESCRIPTION OF THE PREFERRED EMBODIMENTS

Figure 1A:
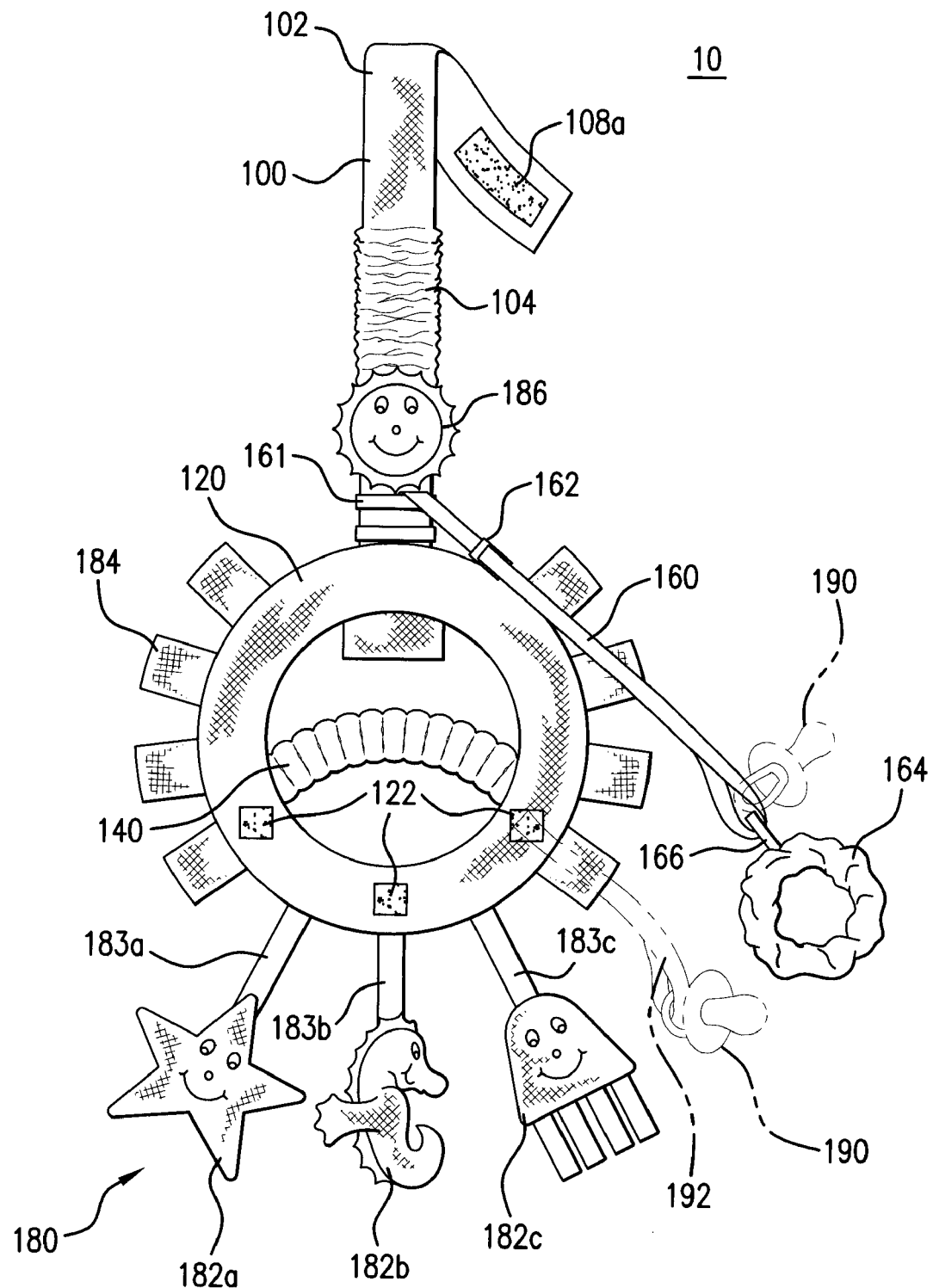
FIG. 1A is a front view of an apparatus formed in accordance with one exemplary embodiment of the present invention.
Figure 1B:
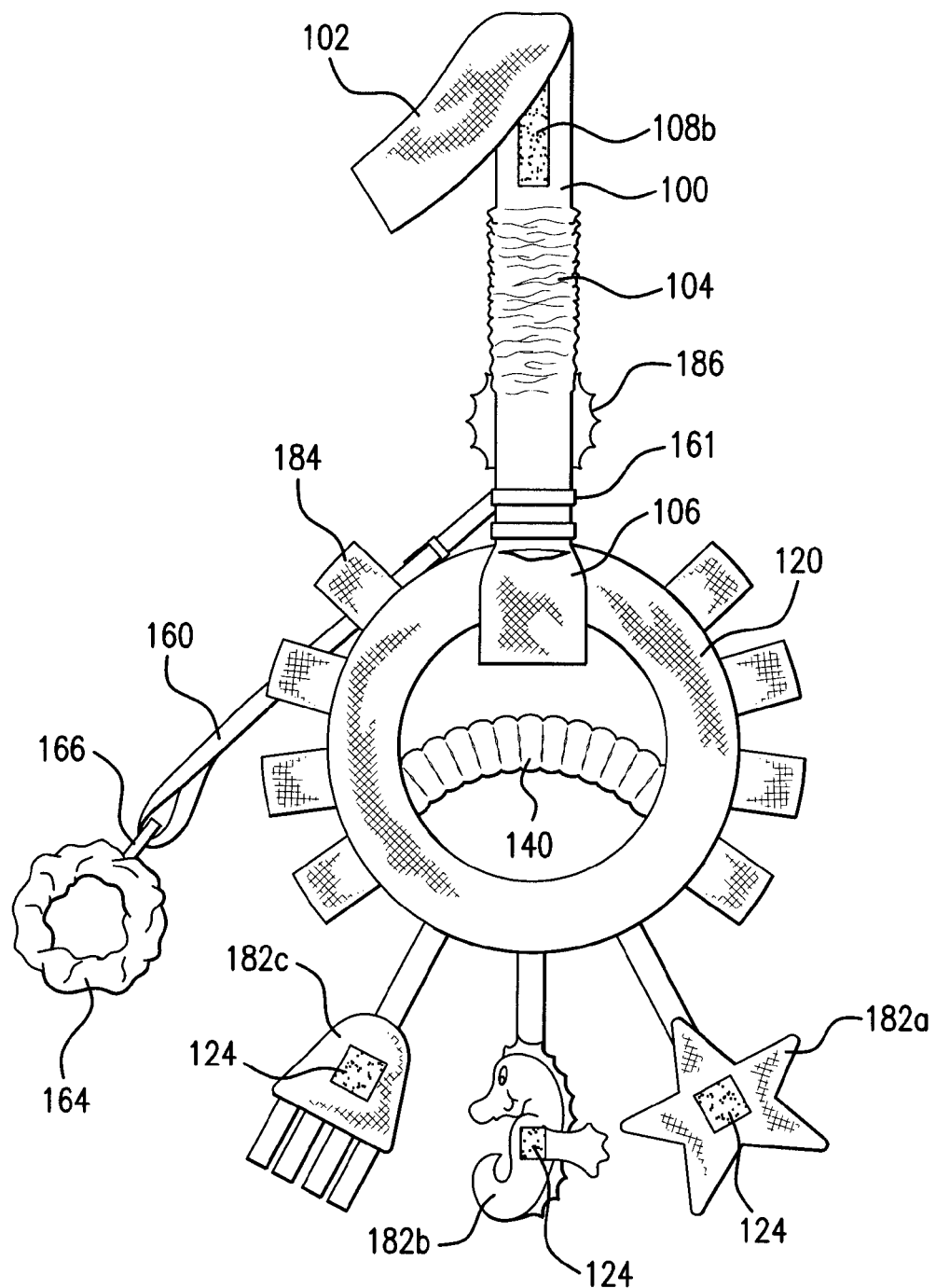
FIG. 1B is a rear view of the embodiment shown in FIG. 1A.

Referring now to FIGS. 1A-1B, there is shown a combined activity center and feed bottle holder apparatus 10 for an infant formed in accordance with one exemplary embodiment of the present invention. In the configuration shown, the apparatus 10 is adapted for detachable coupling to a surrounding support structure, so as to be suspended therefrom over an infant seated or reclined below. Examples of support structures which the apparatus 10 may be used with include a carrying handle provided on recreational infant car seats of various type known in the art.

When properly attached to such support structure, and equipped with a feed bottle held therein, the apparatus 10 provides a temporary self-feeding station for infants who are incapable of holding a feed bottle themselves due to lack of strength, under-developed motor skills, handicap, or other physical limitation. The apparatus gives the caregiver an essentially hands free feeding option, whereby the caregiver would simply insert a filled baby bottle into the bottle holding portion of the apparatus for self access by an infant properly seated and safely latched into a seat below. The apparatus is suitably adjustable to ensure that the bottle's nipple remains within convenient reach for the infant to self-feed as needed or desired.

This affords the caregiver full use of both hands even during feeding, to then continue with and complete routine tasks, after but a momentary interruption—even when the infant's need for feeding/pacification may have been unanticipated, and arose quite abruptly. Of course, a responsible caregiver would continue to simultaneously and responsively monitor the infant, but need not occupy his/her hands to do so. The caregiver would have otherwise strained to hold the bottle in the infant's mouth for the feeding duration, or would have unlatched and removed the child from the car seat altogether to hold the child in one arm, while feeding from the bottle held with the other.

The need for such hands free feeding may be particularly compelling in situations where the caregivers themselves may be driving. Other such situations may arise, for example, during grocery shopping (while pushing a cart with car seat latched onto cart), while waiting out traffic jams during family outings in times which coincide with feeding time, when the feeding of multiple infants (twins, for instance) coincide with one another, and in numerous other contexts. Use of the apparatus 10 in these situations permits the caregiver additional time to go ahead and quickly finish the task at hand all the while meeting the infant's urgent needs. The responsible caregiver will no doubt continue attending to the infant during the feeding process, but he/she is able to do so without committing exclusive hands-on attention to the task.

In accordance with one aspect of the present invention, the apparatus provides for interactive activities, whereby the infant, while feeding, is captivated by visual and/or tactile stimuli. The measures employed to that effect include, for example, bright and colorfully themed multi-textured toys, noise devices, mirror type toys, picture insert toys, ribbons, and other types of creative sewing notions attached to the bottle support structure. The visual/tactile stimuli not only render the feeding experience more relaxing and soothing for the infant, they draw and hold the infant's interest enough that he or she continues to face forward towards the bottle and, naturally, feed on the nipple provided there.

The interactive elements shown in the illustrated embodiments are but examples of numerous interactive element configurations and types which may be suitably employed in accordance with the present invention. The actual choice of such configurations and types employed will depend on the particular requirements of the specific application intended.

Preferably, the apparatus 10 is made sufficiently low in profile and size that it remains minimally obtrusive when put to use. That is, the apparatus 10 is configured to occupy only as much of the space above and before the infant as is necessary to keep its various interactive elements and supported bottle within safe ready reach of the infant. The caregiver is therefore able to maintain close to full view of the infant's face, even while the infant is feeding. This enables the caregiver to easily monitor the feeding process, and to freely communicate with the infant, without having to contend with any significant barrier to effective eye contact and face to face interaction.

In accordance with another aspect of the present invention, the apparatus 10 is formed substantially of a fabric or other material that remains pliable and flexible, so as to be soft and very giving to the touch, while being sufficiently strong and durable to withstand regular daily use with active infants. Especially when used on a car seat assembly, the absence of any hard, rigid surfaces reduces the risk of injury due to accidental impact should the given vehicle undergo overly sudden movement or stop.

Preferably, the apparatus 10 is completely machine-washable. Inasmuch as infant articles are invariably subject to considerable soiling and contamination with normal use, the apparatus 10 may be conveniently cleaned and decontaminated by regular washing. The apparatus 10 may be periodically refreshed in this manner and placed right back into service, with minimal downtime.

In the illustrated embodiment, apparatus 10 generally includes one or more mounting strap portions 100 coupled to a holding ring portion 120. One or more support strap portions 160 are preferably coupled to the mounting strap portion 100, or to the holding ring portion 120. In addition, a plurality of interactive elements 180 are conspicuously attached at various parts of the portions 100, 120 so as to be readily touched, handled, and even detached in some cases by a curious and engaged infant. These interactive elements 180 may be of any suitable form and configuration other than those illustrated, so long as they offer effective visual and/or tactile—or even audible—stimuli to an infant.

The mounting strap portion 100 includes an adjustable textile strap 102 which may be secured to a car seat handle or other surrounding structure to suspend the apparatus 10 therefrom. The strap portion 100 is preferably formed to secure in adjustable manner so that the holding ring portion 120 (attached at a lower end of the mounting strap portion 100) is held at the proper level (relative to the infant's face) to suitably hold a baby bottle with liquid content for feeding.

Preferably, the strap portion 100 is at least partially formed of an elastic material. In the embodiment shown, the strap portion 100 includes an intermediate elastic segment 104 extending between the strap 102 and an attachment segment 106 which connects to the holding ring portion 120. Any suitable means known in the art may be employed at or near a terminal end of the strap 102 to enable adjustable securement to a surrounding structure, but in the embodiment shown, a VELCRO, or hook and loop type fastener, 108a is preferably employed for releasable fastening to a corresponding fastener 108b formed on a different part elsewhere on the strap portion 100. The strap 102 formed as shown may be wound around the given support structure by the required amount, then secured by joining the fasteners 108a and 108b one with the other. Depending on the material and fastener type used, the free end of the strap 102 may also be secured directly to any other part of the mounting strap portion via its fastener 108a.

The fastener 108b may be located at any suitable point along the mounting strap portion 100. If necessary, the fastener 108b may be placed below the elastic segment 104, such that the elasticity enables the adjustable strap 102 to adapt to a wide range of sizes (thicknesses) and surface contours in the given support structure. The added resilience of the wound strap in that case would obviate the need to detach apparatus 10 from the support structure to make way for lifting the infant out from the seating area below. Again depending on the location of the fastener 108b, the mounting strap portion may be easily slid and adjusted over the various thicknesses of an irregularly contoured support structure (like a car seat handle).

The attachment segment 106 is attached to the holding ring portion 102 by stitching or any other such suitable means known in the art. In the embodiment shown, this segment 106 is formed to define a storage pouch for storing a pacifier or other implement which may be provided with apparatus 10, while not in use. In alternate embodiments, other suitable storage articles attachable to the mounting strap or holding ring portions 100, 120 may be employed with or in place of the pouch 106.

The holding ring portion 120 is formed generally as a stuffed textile annular ring which hangs from the mounting strap portion 100. An infant feed bottle may be inserted in through the back of the holding ring portion 120 and advanced therethrough until it is pointing at a slight downward incline, with its feed nipple situated to comfortably insert into the infant's mouth.

Preferably, a center pressure strap 140 is provided to extend laterally across the central opening defined by the holding ring portion 120, so as to retain the base of the bottle within the central opening. The pressure strap 140 may be stitched or otherwise coupled to the holding ring portion at its opposed ends, such that its intermediate segment forms an elastic retention band preferably enclosed with fabric sleeve. The ends of the pressure strap 140 may be sewn, for instance, within the inner seams at opposite sides of the holding ring portion 120 for a neat and simple appearance. The center pressure strap 140 biases the holding ring portion 120 towards a circular shape about the bottle's base, rather than drooping when in use.

The ends of the strap are fastened to the holding ring portion 120 at, for example, approximately one quarter of the length down its inside seam (about the substantially circular central opening). The elastic material within the pressure strap 140 draws the inside seams closer together to apply constrictive, retaining pressure about especially the top side of the bottle's base while it is in use within the holding ring portion 120. This helps to keep the bottle at the proper feeding angle and keeps the bottle from slipping forward towards the infant's face while the infant is feeding.

The support strap portion 160 includes a slighter fabric strap connected at one end to either the strap portion 100 or the holding ring portion 120 (preferably, by releasable attachment to a fastening collar 161, for example) and provided at the other end with an engagement member. The support strap portion 160 preferably also includes an adjustment device, such as a buckle 162, which enables length adjustment of the strap. In the illustrated embodiment, the engagement member is configured as a band 164 (preferably elastic), with an attachment loop 166 through which a free end of the strap passes and wraps around to be fastened (to an intermediate part of the strap) by the adjustable buckle 162. The band 164 may be alternatively attached to the support strap by a VELCRO or other fastener, by sewing or permanently tacking, or by any other suitable fastening means. In any event, the elastic band 164 serves to engage a neck of the feed bottle whose base is held by the holding ring portion 120, to thereby offer optional stabilizing angle support for the front feeding, or nipple, end of the bottle. The length of the bottle support band is adjusted via the buckle 162 to accommodate different bottle lengths.

The bottle neck engaging band 164 in the embodiment of FIGS. 1A-1B is configured as an elastic band of suitable diameter enveloped by a fabric sleeve and connected to the support strap by the loop 166 sewn into the outside seam of the band or sleeve. The band 164 may be slid over the nipple end of the bottle until it retentively engages the bottle's neck. When the bottle support strap is adjusted to the proper length, the support strap and band support the bottle front end to keep it from tilting excessively downward.

The support strap portion 160 thus stabilizes the bottle held by the apparatus during feeding, and sustains the angle at which it is made available to the feeding infant. The added support provided thereby alleviates nipple drip once the infant stops feeding and releases the latch of the nipple from his/her mouth. It also assists an older infant in guiding the nipple readily by hand back into the mouth for continued feeding thereafter.

As illustrated in broken lines, the caregiver may optionally attach a pacifier 190 to the bottom end of the support strap portion 160 when the apparatus is not holding a bottle (or alternatively to the holding ring portion 120 directly, by attaching via its own strap 192 to a fastening element 122). The pacifier may then be suspended at or near eye level of the infant, to stay well within reach and available on demand, should the infant need it. The strap also serves as a tether which keeps the pacifier from hitting the floor if the infant were to expel it from his/her mouth.

The strap may serve in this regard as a tether for the feed bottle as well, were the infant to somehow manage to pull the bottle's base out of the holding ring portion 120 during feeding. As infants develop their motor skills (at approximately 5 to 6 months), they will tend to do this with increasing force and regularity. If they succeed in withdrawing the bottle far enough, its base will fall from engagement with the holding ring portion 120. The bottle would no longer be accessible to the infant for continued feeding at that point; nonetheless, its securement to the engaging member is preferably such that it would remain tethered by the support strap portion 160— hanging from the apparatus 10 rather than falling to the floor—until the caregiver takes notice and readjusts the bottle. The bottle would remain held in upright manner, so that its contents do not leak and drip onto the infant.

Older, more developed infants (between approximately 4 to 6 months) will actually try and maintain supporting hold and control of the bottle while they feed. Since the weight of the bottle and its contents is primarily supported at the base by the holding ring portion 120, the infant may very well establish controlling hold of the bottle's forward portion. The infant's ability to do this comfortably will increase as the infant matures and his/her motor skills develop further. At some point, the infant may outgrow the need for the stabilizing strap portion 160 altogether (at least for its stabilizing support function), though the strap portion 160 may remain useful for its tethering function.

When the support strap portion 160 is not in use, the strap, neck engaging band 164, and/or pacifier may all be conveniently stored in the storage pouch 106. They would remain effectively out of the way and clean until removed from the pouch 106 for further use.

A plurality of interactive elements 180 in the form of toys, decorative fasteners, or other colorful decorations 182a, 182b, 182c, 184, 186, are sewn or otherwise attached to the mounting strap and holding ring portions 100, 120. These interactive elements 182a, 182b, 182c, 184, 186 provide amusement while presenting stimuli which provoke sufficient curiosity of the infant to attentively examine or manipulate it, even while feeding from the bottle held by apparatus 10. The elements 180 may be detachably attached to mounting strap and holding ring portions 100, 120 using any suitable fastening measures, such as tie ribbons, VELCRO, tethered retaining rings, or the like.

In the embodiment shown, the apparatus 10 is equipped, for example, with a mirror surface-framed smiley face token 186; plush toys in the shape and animated likeness of starfish 182a, seahorse 182b, or octopus 182c characters; and, radiant ribbons 184. The toy-like elements may be formed with various textures and colors, and may even produce sound if squeezed or particularly handled in other predetermined manner. Additional fastening elements (such as VELCRO tabs) 122 are provided on the surface of the holding ring portion 120 for securement of one or more interactive elements 182a, 182b, 182c, or for auxiliary attachments of choice like photographs, pictures, mirrors, or the like. Each of the plush toy elements 182a, 182b, 182c in the illustrated embodiment is provided with a fastening element 124 on its back side to permit attachment freely on the holding ring portion 120, either directly or using a fastening element 122 provided thereon.

These various interactive elements 180 intrigue the infant and excite his sight and hearing senses. In prompting responsive interactivity, they promote hand-eye coordination and cognitive thinking abilities. Hence, the elements 180 help sharpen both physical and mental acuity, while soothing and comforting the infant. If used regularly enough (as would be the case if used on the infant's car seat), the visually conspicuous interactive elements 180 would become recognizable to the point of familiarity, which in turn grows to a source of reassuring comfort. The elements 180 are preferably configured individually in accordance with a given them which may be adjusted simply by replacement of those elements. An example is the beach theme shown in the illustrated embodiment, which may include various sea creatures—like the starfish, sea horse, octopus represented, as well as others not represented like the sea turtle and various fishes. The theme may also include the sun (as represented by the token 186) and its radiating sunshine (as represented by the holding ring portion 120 and the ribbons 184 radiating therefrom). Among other examples may be a summer theme, which would include creatures often seen during the summer season, such as lady bugs, dragon flies, sunshine, snails, frogs, and the like.

The interactive elements 180 preferably define a common collective theme. Nonetheless, they are configured with both visual and tactile distinctions one from the other. The infant is thereby presented at one time with widely varied sources of sensory engagement.

To enable the infant to freely handle and manipulate them, some or all of the interactive elements 180 may be tethered to the holding ring or mounting strap portions 120, 100 by individual element straps 183a, 183b, 183c, such as shown for the plush toy elements 182a, 182b, 182c. Such element straps guard against unintended separation (and loss) from the apparatus 10 during daily use and cleaning.

Figure 2A:
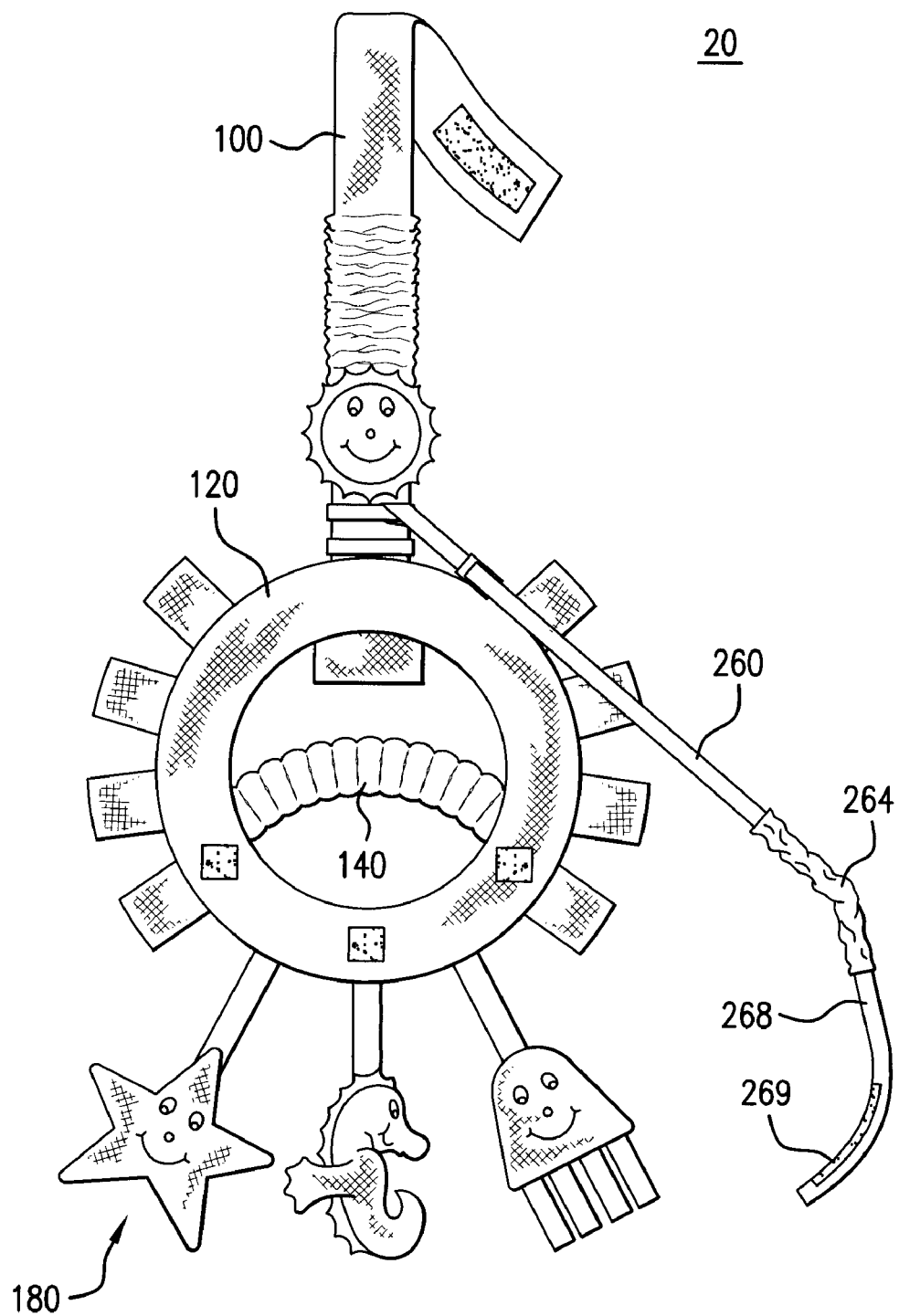
FIG. 2A is a front view of an apparatus formed in accordance with an alternate embodiment of the present invention.
Figure 2B:
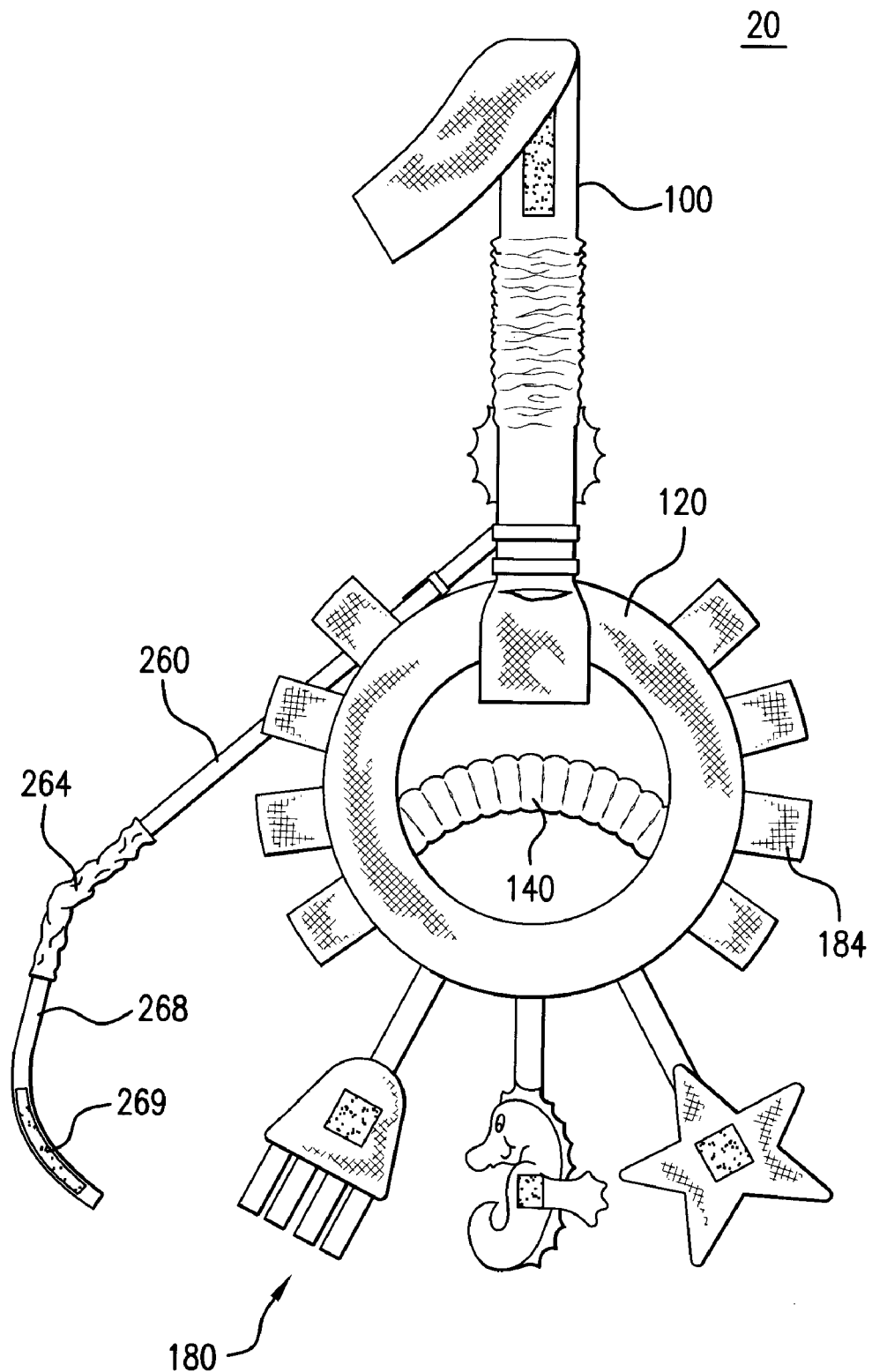
FIG. 2B is a rear view of the embodiment shown in FIG. 2A.

The apparatus 10 may be varied in configuration according to numerous alternative embodiments of the present invention. FIGS. 2A-2B illustrate one such alternative embodiment, wherein the same reference numbers are employed to reference like features employed in the embodiment described in preceding paragraphs. In this embodiment, apparatus 20 includes a support strap portion 260 formed at its free end with an elastic strip 264 (preferably enveloped within a soft fabric sleeve) terminated by a closure strip 268. The closure strip 268 is provided with a hook and loop type fastener(s) 269. The elastic strip may then be stretched and snuggly wrapped about the neck portion of the given bottle; whereupon, the closure strip 268 may be wrapped about a suitable part of the support strap portion 260, and secured to itself using the fastener(s) 269.

Figure 3:
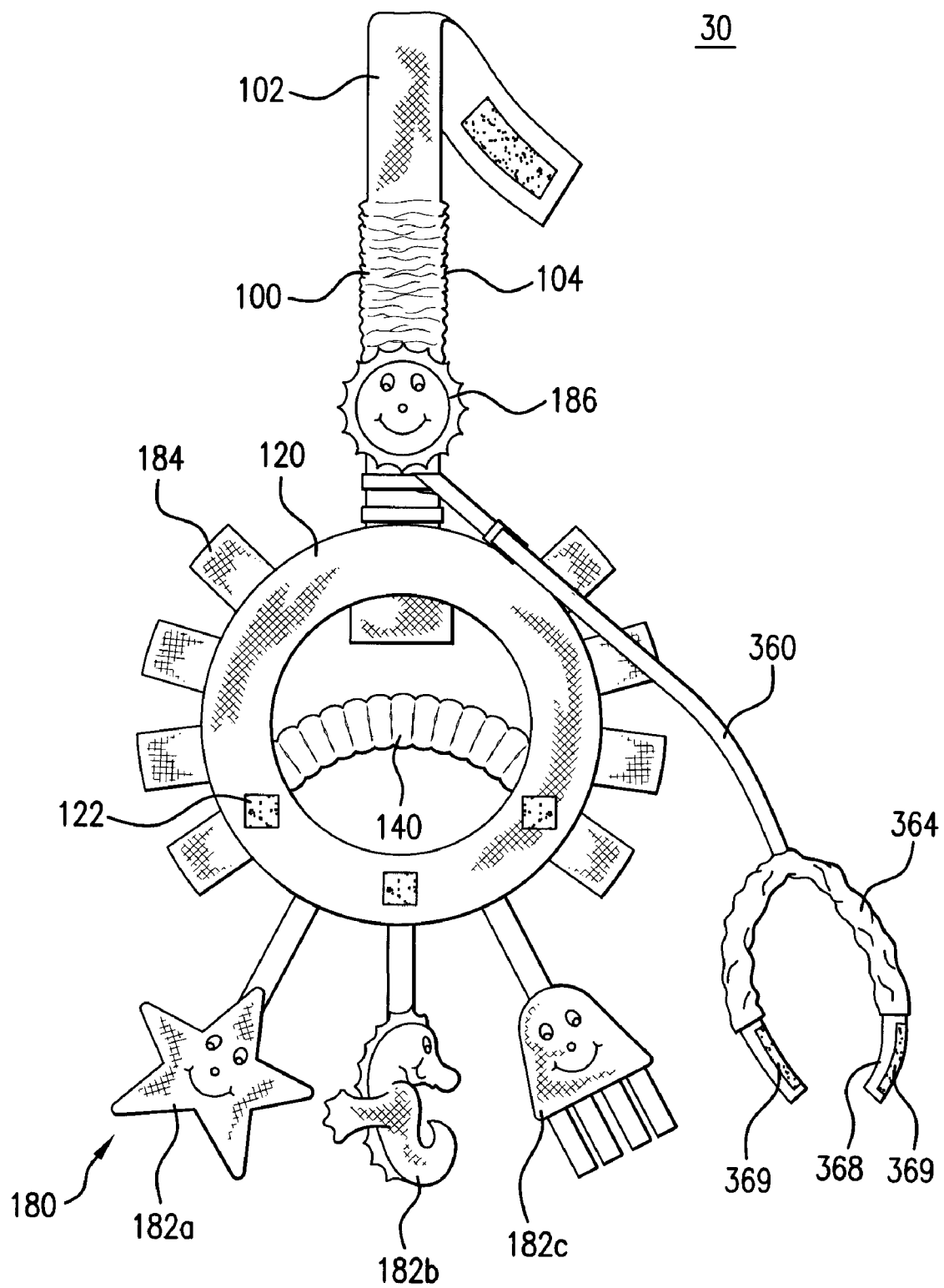
FIG. 3 is a front view of an apparatus formed in accordance with another alternate embodiment of the present invention.

Another alternative embodiment of the present invention is illustrated in FIG. 3. The apparatus 30 in this embodiment alternatively includes a support strap portion 360 formed with an elastic strip 364 (preferably enveloped within a soft fabric sleeve) intermediately sewn or otherwise attached at its free end (to define a T-shaped configuration therewith). At each terminal end of the strip 364 is formed a closure strip 368 provided with a fastener 369. Once the elastic strip 364 is stretched and snuggly wrapped about the neck or other forward portion of the bottle, the closure strips 368 may be overlapped about one another so that their fasteners 369 engage to hold the elastic strip 364 securely wrapped.

Other embodiments may alternatively employ a spring clip, extended mounting strap, or other such attachment at the free end of the mounting strap portion 100. The mounting strap portion 100 would then be adapted to engage various items for support like canopy components of carriages, side hanging hooks in vehicle compartment. The flexible main mounting strap itself may be replaced with a plastic or metal mounting spring clamp device; bendable metallic wire; a flexible or rigid mounting arm or frame device; a metal or plastic rod or rods; a fabric strap with various fasteners provided thereon; or the like.

In still other embodiments, the center pressure strap 140 may be replaced with other devices of suitable type capable of applying bias pressure to the sides of the bottle to hold it in place within the holding ring portion 120. Such other alternative devices may include, for example: a fabric strap with a rubber-like material application to resist slipping; a spring release clamp device; a band of rubber material; a fabric band enclosing flexible wire; a spring tension mechanism; a rubber molded opening which applies pressure on all sides of the bottle; a fabric strap or straps provided with adjustable closures; or the like.

In other alternative embodiments, the structure and configuration of the holding ring portion 120 may altered to include, for example, the following: a fabric ring enclosing bendable wire; a rubber or other elastic ring; a rubber cup, sack or sling structure formed of suitable textile material to support the bottle base; a spring release clamp; or the like. The holding ring portion 120 may also be formed with a shape other then a generally oval or circular loop. For example, it may be formed with a square, diamond, triangle, or other polygonal shape sufficiently formed to define a central opening and apply sufficient radial/transverse pressure to the sides of the bottle base passed therethrough to prevent slippage.

Figure 4:
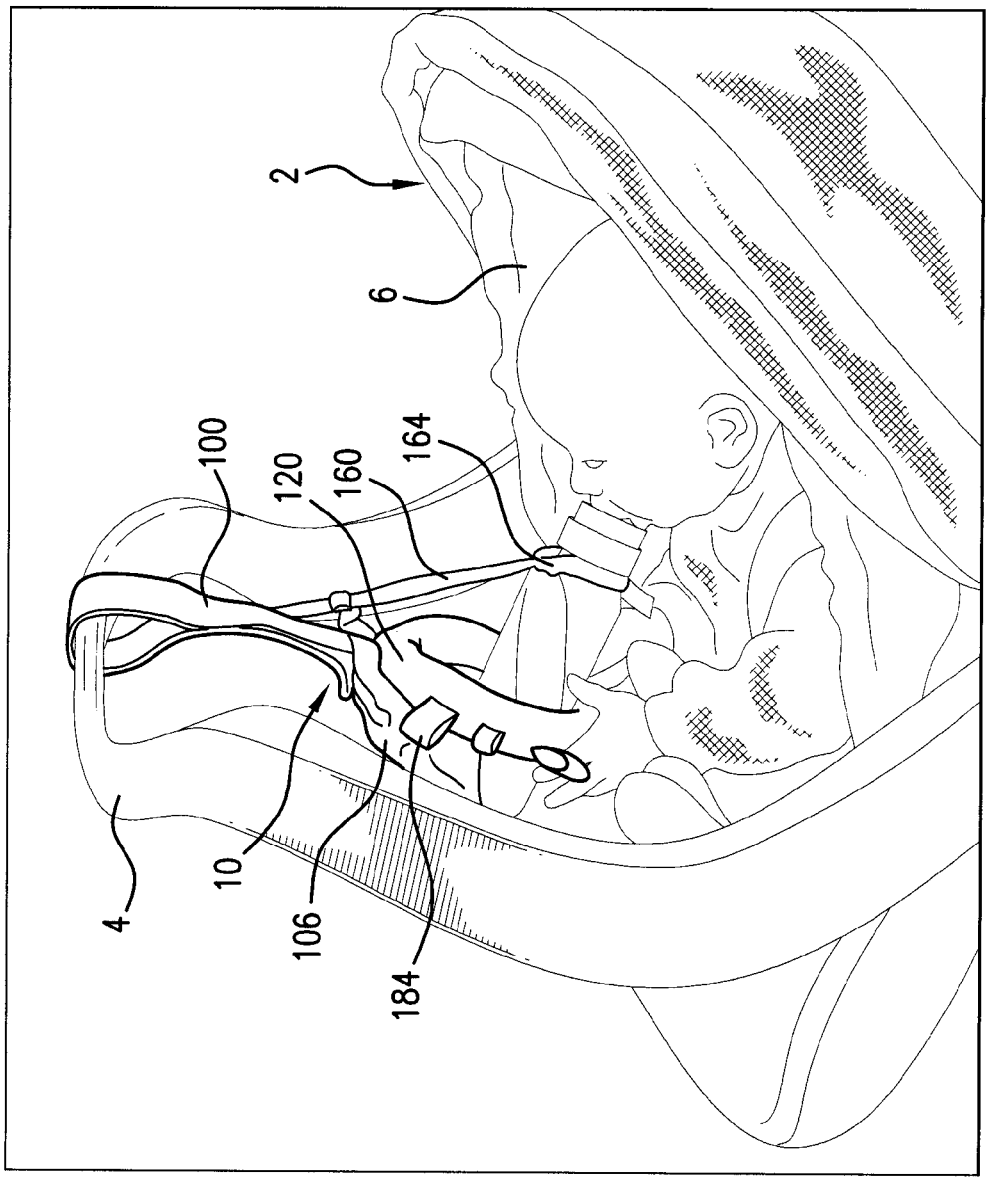
FIG. 4 is a side perspective view of the embodiment of FIGS. 1A-1B, shown being used in one illustrative application; and, FIG. 5 is a front perspective view of the illustrative application shown in FIG. 4.
Figure 5:
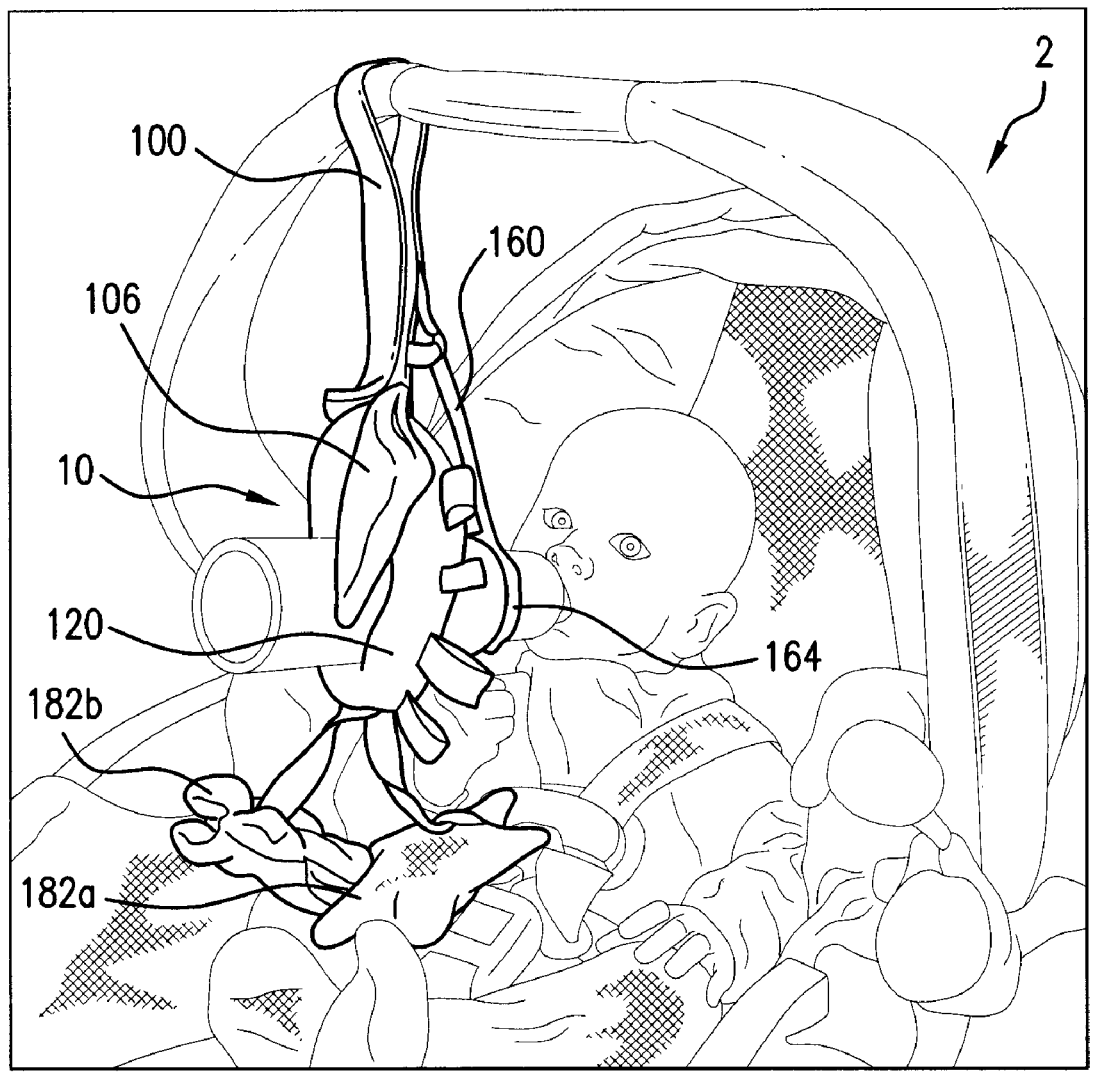

Referring now to FIGS. 4-5, the apparatus 10 is shown in one illustrative application with a recreational car seat 2 of a type widely used by families with infants. Such recreational car seats 2 are formed with a carrying handle structure 4 which loops over and above a seat compartment 6, as shown. The structure of such recreational car seats 2 is described herein for illustrative purposes, for a clearer understanding of the manner in which apparatus 10 may be utilized, and does not form a part of the present invention. Apparatus 10 may be employed with surrounding structures other than the seat 2 shown, as determined by the requirements of the intended application.

The apparatus 10 is used in the illustrated application while the infant is sitting and latched properly into the car seat 2. The adjustable mounting strap portion 100 secures to an intermediate part of the carrying handle structure 4 to suspend the holding ring portion 120 over the infant's seat compartment 6. The mounting strap portion 100 is adjusted to the correct, desired length so that the holding ring portion 120 is suspended just above the infant's face. The given feed bottle is then gently inserted; nipple end first, in through the backside of the bottle ring underneath the pressure strap 140. The front tip of the bottle, or nipple, is guided gently into the infant's mouth, so that the infant may suck the formula out of the bottle without ingesting air. The bottle will preferably be oriented approximately at a 45 degree incline down to the infant's mouth.

The optional adjustable support strap portion 160 is positioned to extend from a lower end of the mounting strap portion 100 to securely attach at or about the neck of the feed bottle. If the support strap portion 160 is to be used, it may be preferable to first engage the bottle neck with the engaging band 164 provided at the end of the support strap portion 160, then to gently pull the holding ring portion 120 back away from the baby's face and insert the base of the bottle (bottle bottom end first) mid-way from the front side of the holder ring portion 120, underneath the pressure strap 140. The apparatus 10 and bottle may then be urged forward towards the baby's face and the nipple gently inserted into the baby's mouth for feeding. The caregiver at this point may gently slide the holding ring portion 120 backwards or forwards, as necessary, with one hand while steadying the bottle with the other to make fine positioning adjustments.

The support strap portion 160 may be adjusted in length by repositioning its adjustment buckle to take up or release slack, as needed, to keep the support strap portion 160 sufficiently taut but without overly restrictive pull. Apparatus 10 would thus hold the bottle, ideally, so that the nipple may be effortlessly received by the infant, and just as effortlessly expelled by him/her. Once the bottle is suspended at the acceptable angle toward the infant's mouth (to keep air from entering the nipple end of the bottle), and properly positioned, the caregiver may let the self-feeding proceed, then go about concurrently tending other tasks.

Typically, the adjustable mounting strap and support strap portions 100, 160 will be pre-adjusted by the caregiver to proper lengths well before an infant's feeding session. So long as the apparatus 10 is used with the same infant, with the same support structure, and similar bottles, the need for later in situ adjustments should be minimal. Subsequent length adjustments should be required only periodically to accommodate the infant's growth, or changes in bottle type/size.

The subject apparatus improves upon the current self-feeding devices in a number of ways. Unlike other bottle holders, the caregiver need not remember to pack it. The apparatus may be attached and left on the car seat handle (in the exemplary application shown) given its combined activity center features. The apparatus also offers the option of holding a pacifier or other comforting implement for the infant, even if the bottle holding function is not being utilized. If the optional support strap and neck engaging band are used during feeding, they serve as a tether to guard against the bottle's contents from leaking onto the baby's front or onto the floor. Unlike other infant self-feeding devices, moreover, the apparatus helps to lower risk of infant ailments like ear infections and digestive tract problems such as gas and acid reflux by forcing the infant to remain in at least a partial upright position (to reach the bottle) when feeding. In many other self-feeding devices the infant is accommodated in a virtually horizontal position.

Still other feeding devices provide pillow like objects with an elastic type of band to help keep the bottle in place. Such devices are typically propped on the infants' chest while lying on their backs in a horizontal position. The bottle is slid into a holding device and the nipple is pointed downward into an infant's mouth.

This is an unhealthy way for any individual to ingest a liquid, let alone for infants who are bottle feeding, where the weight of the formula rushing to the nipple only adds to the potential risks. Even after the infant stops the suckling motion and the tongue-thrusts the bottle outward, the added weight of the contents may keep the nipple lodged in the infant's mouth, unless the bottle is completely empty. This presents the risk of choking, among other things.

The general pediatric opinion is that infants fed while lying down in this manner are more likely to develop ear infections. In accordance with an aspect of the present invention, proper operation of the apparatus requires the baby to be upright enough to actually reach and receive the transversely directed front tip of the suspended bottle. Preferably, the apparatus makes the bottle tip thus accessible when the infant is in a fully latched position, where used with a car seat. This reinforces pediatric recommendations for infants to be held upright during bottle feeding for better digestion.

The apparatus permits the infant to effortlessly expel the bottle's nipple once he/she is done self-feeding. The apparatus suspends the bottle without undue restriction, such that the infant may simply thrust his/her tongue forward to expel the nipple, much in the manner that infants routine expel pacifiers, as the holding structure of the apparatus permits the bottle to gently give way. The nipple may then just fall below the infant's chin or remain suspended near the infant's mouth depending on the fine adjustments made to the apparatus. The optional support strap and bottle neck band will keep the bottle from falling too low.

The following list of components and dimensional quantities are provided to illustrate but one of numerous examples of a device formed according to one embodiment of the present invention. The listed information does not constitute any limitation to the present invention, the scope of which is defined in the appended Claims.

EXAMPLE

Approximate lengths and widths of components in Example:
Mounting Strap—14 inches (length), 1 inch width
Bottle Support Strap—15¾ inches (length), ½ inch width
Alternative Bottle Support Straps (in attached diagrams)
Alternative A Bottle Support Bottle Strap—19 inches length
Alternative B Bottle Support Strap—9½ inches length
Attached "T"-Strap (Alternative B)—8 inches length, ½ inch width
Sewn loop to attach Bottle support strap—sewn approximately 2 inches above connected Bottle Ring. Length 1 inch, width ½ inch.
Pacifier Pouch—3 inches in length, 2½ inches width
Loop attaching Pacifier Pouch—2 inches in length, ½ width Bottle Ring—(measurements taken from outer seam of Bottle Ring)—5 inches length and 6 inches width. (Center pressure strap pulls on inner side seams of bottle ring, giving it the appearance of a circle versus an oval).

Center Pressure strap—while sewn into inner seams of Bottle Ring—2 inches length and 1 inch width. While stretched—4 inches width.

Toys straps—Varies—between 2½ and 3 inches in length and varies in width—between ½ and ¾ inch.

Interactive toys—Varies—in width and length between 2 and 5 inches.

Decorative ribbons and notions—Varies. While folded and sewn into the Bottle Ring—Length varies from ½ inch to 2 inches. Width of ribbons and notions between ½ inch and 2 inches.

VELCRO closures on the Apparatus vary in length between 1 inch and 7 inches depending upon the various length adjustments needed. Width ¾ inch.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular combinations of method steps may be reversed or interposed, all without departing from the spirit and scope of the invention as defined in the appended Claims.

What is claimed is:

1. A combined activity center and bottle holder apparatus for infant comprising:
   at least one mounting strap portion having upper and lower ends;
   a holding ring portion disposed at a lower end of the mounting strap portion, said holding ring portion defining a looped receiving space for a base portion of a feed bottle;
   a support strap portion coupled to at least one of said mounting strap and holding ring portions, said support strap portion including an engaging member for retentively engaging a forward portion of the feed bottle; and
   a plurality of interactive elements coupled in manipulable manner to at least one of said mounting strap and holding ring portions, each of said interactive elements being thematically configured with visual and tactile distinction one from the other;
   wherein said mounting strap portion is formed of a fabric material, said mounting strap including an elastic segment at an intermediate part thereof, said mounting strap having a fastener formed at least at said upper end thereof.

2. The apparatus as recited in claim 1, wherein said holding ring portion includes an elastic pressure strap extending transversely across said receiving space.

3. The apparatus as recited in claim 1, wherein said holding ring portion is formed of a fabric material extending annularly about said receiving space.

4. The apparatus as recited in claim 1, further comprising a storage pouch disposed on at least one of said mounting strap and holding ring portions.

5. The apparatus as recited in claim 1, wherein said support strap is detachably coupled to one of said mounting strap and holding ring portions, said support strap being formed of a flexible material and adjustable in length.

6. The apparatus as recited in claim 5, wherein said engaging member is formed at a free end of said supporting strap portion.

7. The apparatus as recited in claim 5, wherein said engaging member is selected from the group consisting of an elastic band defining a retaining loop, an elastic strip terminating at a closure strip for retentively winding about a neck portion of the bottle; and, an elastic strip intermediately disposed between a pair of opposed closure strips for retentively winding about a neck portion of the bottle.

8. The apparatus as recited in claim 1, wherein at least one of said interactive elements is detachably coupled to at least one of said mounting strap and holding ring portions.

9. The apparatus as recited in claim 1, wherein said mounting strap portion, holding ring portion, support strap portion, and said interactive elements are each formed substantially of a fabric material.

10. A minimally obtrusive support apparatus for a feed bottle comprising:
    at least one mounting strap portion having upper and lower ends, said mounting strap including an elastic segment at an intermediate part thereof;
    a holding ring portion disposed at a lower end of the mounting strap portion, said holding ring portion defining an annular receiving space for a base portion of a feed bottle, and including an elastic pressure strap extending transversely across said receiving space;
    a support strap portion detachably coupled to at least one of said mounting strap and holding ring portions, said support strap portion including an engaging member at a free end thereof for retentively engaging a forward portion of the feed bottle; and,
    a plurality of interactive elements coupled in manipulable manner to at least one of said mounting strap and holding ring portions, each of said interactive elements being thematically configured with visual and tactile distinction one from the other.

11. The apparatus as recited in claim 10, further comprising a storage pouch disposed on at least one of said mounting strap and holding ring portions.

12. The apparatus as recited in claim 10, wherein said mounting strap includes a fastener formed at least at said upper end thereof.

13. The apparatus as recited in claim 10, wherein said engaging member is selected from the group consisting of: an elastic band defining a retaining loop, an elastic strip terminating at a closure strip for retentively winding about a neck portion of the bottle; and, an elastic strip intermediately disposed between a pair of opposed closure strips for retentively winding about a neck portion of the bottle.

14. The apparatus as recited in claim 10, wherein at least one of said interactive elements is detachably coupled to at least one of said mounting strap and holding ring portions.

15. The apparatus as recited in claim 10, wherein said mounting strap portion, holding ring portion, support strap portion, and said interactive elements are each formed substantially of a fabric material.

16. A flexible apparatus for combined support of infant feed bottle and infant manipulable attachments, comprising:
    at least one mounting strap portion having upper and lower ends, said mounting strap including an elastic segment at an intermediate part thereof, said mounting strap including at least one fastener formed at least at said upper end thereof;
    a holding ring portion disposed at a lower end of the mounting strap portion, said holding ring portion defining an annular receiving space for a base portion of a feed bottle, and including an elastic pressure strap extending transversely across said receiving space;

a support strap portion detachably coupled to at least one of said mounting strap and holding ring portions, said support strap portion including an engaging member at a free end thereof for retentively engaging a forward portion of the feed bottle; and, a plurality of interactive elements coupled in manipulable manner to at least one of said mounting strap and holding ring portions, each of said interactive elements being thematically configured with visual and tactile distinction one from the other, at least one of said interactive elements is detachably coupled to at least one of said mounting strap and holding ring portions.

17. The apparatus as recited in claim 16, wherein said engaging member is selected from the group consisting of: an elastic band defining a retaining loop, an elastic strip terminating at a closure strip for retentively winding about a neck portion of the bottle; and, an elastic strip intermediately disposed between a pair of opposed closure strips for retentively winding about a neck portion of the bottle.

18. The apparatus as recited in claim 16, further comprising a storage pouch disposed on at least one of said mounting strap and holding ring portions.

19. The apparatus as recited in claim 18, wherein said mounting strap portion, holding ring portion, support strap portion, said interactive elements, and said storage pouch are each formed substantially of a fabric material.

* * * * *